(12) United States Patent
Fujishiro et al.

(10) Patent No.: US 11,350,460 B2
(45) Date of Patent: May 31, 2022

(54) COMMUNICATION CONTROL METHOD AND RADIO TERMINAL

(71) Applicant: KYOCERA Corporation, Kyoto (JP)

(72) Inventors: Masato Fujishiro, Yokohama (JP); Hiroyuki Urabayashi, Yokohama (JP); Hiroyuki Adachi, Kawasaki (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 16/573,799

(22) Filed: Sep. 17, 2019

(65) Prior Publication Data

US 2020/0015280 A1   Jan. 9, 2020

Related U.S. Application Data

(63) Continuation of application No. PCT/JP2018/009214, filed on Mar. 9, 2018.

(30) Foreign Application Priority Data

Mar. 23, 2017  (JP) .............................. JP2017-058226

(51) Int. Cl.
   *H04W 74/08*  (2009.01)
   *H04W 76/27*  (2018.01)
   *H04W 24/08*  (2009.01)
   *H04W 4/02*  (2018.01)
   *H04W 16/26*  (2009.01)

(52) U.S. Cl.
   CPC ....... *H04W 74/0833* (2013.01); *H04W 4/027* (2013.01); *H04W 16/26* (2013.01); *H04W 24/08* (2013.01); *H04W 76/27* (2018.02)

(58) Field of Classification Search
   CPC . H04W 74/0833; H04W 76/27; H04W 4/027; H04W 16/26; H04W 24/08

USPC ......................................................... 370/329
See application file for complete search history.

(56) References Cited

U.S. PATENT DOCUMENTS

| | | | | |
|---|---|---|---|---|
| 8,862,172 | B1* | 10/2014 | Vujcic | H04W 48/12 |
| | | | | 455/515 |
| 9,736,823 | B2* | 8/2017 | Furuskog | H04W 74/0833 |
| 10,334,570 | B2* | 6/2019 | Caretti | H04W 76/14 |
| 2009/0042582 | A1* | 2/2009 | Wang | H04W 74/0866 |
| | | | | 455/450 |

(Continued)

OTHER PUBLICATIONS

3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 14); 3GPP TS 36.300 V14.1.0; Dec. 2016, pp. 1-317, Valbonne, France.

*Primary Examiner* — Mong-Thuy T Tran
(74) *Attorney, Agent, or Firm* — Studebaker & Brackett PC (57) ABSTRACT

A communication control method according to one embodiment is used in a mobile communication system. The communication control method comprises a step A of predicting, by a UE, a radio condition within a second period after connection between the UE and a eNB is established, in a first period for which the connection is not established, and a step B of performing, by the UE, a random access procedure for establishing the connection. The step B includes a step of performing notification of information on the predicted radio condition from the UE to the eNB in the random access procedure. The information is used, by the eNB, for controlling communication with the UE.

3 Claims, 8 Drawing Sheets

(56) References Cited

U.S. PATENT DOCUMENTS

| | | | | |
|---|---|---|---|---|
| 2011/0261713 A1* | 10/2011 | Kishiyama | ........ | H04W 72/1226 370/252 |
| 2014/0169300 A1* | 6/2014 | Kim | ................. | H04W 72/0413 370/329 |
| 2015/0208259 A1* | 7/2015 | Ouchi | ................... | H04W 48/16 370/252 |
| 2015/0215830 A1* | 7/2015 | Dalsgaard | ......... | H04W 36/0088 455/444 |
| 2016/0014815 A1* | 1/2016 | Vajapeyam | ............. | H04W 4/70 370/329 |
| 2017/0005770 A1* | 1/2017 | Shimezawa | ............ | H04L 5/0092 |
| 2017/0231011 A1* | 8/2017 | Park | ..................... | H04W 74/006 |
| 2017/0251460 A1* | 8/2017 | Agiwal | ............. | H04W 72/0406 |
| 2017/0295596 A1* | 10/2017 | Chen | ..................... | H04L 5/0053 |
| 2019/0230569 A1* | 7/2019 | Kim | ...................... | H04W 36/32 |
| 2019/0349055 A1* | 11/2019 | Bhattad | ............. | H04W 72/0453 |
| 2020/0374855 A1* | 11/2020 | Zhu | ...................... | H04J 11/0076 |

* cited by examiner

COMMUNICATION CONTROL METHOD AND RADIO TERMINAL

RELATED APPLICATIONS

The present application is a continuation based on PCT Application No. PCT/JP2018/009214, filed on Mar. 9, 2018, which claims the benefit of Japanese Patent Application No. 2017-058226 (filed on Mar. 23, 2017). The content of which is incorporated by reference herein in their entirety.

TECHNICAL FIELD

The present disclosure relates to a communication control method and a radio terminal for a mobile communication system.

BACKGROUND ART

In recent years, radio terminals that provide machine type communication (MTC) and internet of things (IoT) services in which communication is performed without human have attracted attention. Such radio terminals need to realize low cost, wide coverage, and low power consumption. Thus, in the 3rd generation partnership project (3GPP), new categories of radio terminals each having a transmission and reception bandwidth restricted to only a part of a system transmission and reception band are specified. An enhanced coverage function including repetitive transmission (repetition) or the like is applied to such radio terminals belonging to the new categories.

SUMMARY

A communication control method according to one embodiment is used in a mobile communication system. The communication control method comprises a step A of predicting, by a radio terminal, a radio condition within a second period after connection between the radio terminal and a base station is established, in a first period for which the connection is not established, and a step B of performing, by the radio terminal, a random access procedure for establishing the connection. The step B includes a step of performing notification of information on the predicted radio condition from the radio terminal to the base station in the random access procedure. The information is used, by the base station, for controlling communication with the radio terminal.

A radio terminal according to one embodiment is used in a mobile communication system. The radio terminal a controller configured to predict a radio condition within a second period after connection between the radio terminal and a base station is established, in a first period for which the connection is not established. The controller is configured to perform a random access procedure for establishing the connection. The controller is configured to perform notification of information on the predicted radio condition to the base station from the radio terminal in the random access procedure. The information is used, by the base station, for controlling communication with the radio terminal.

DESCRIPTION OF EMBODIMENTS

(1) Mobile Communication System

Figure 1:
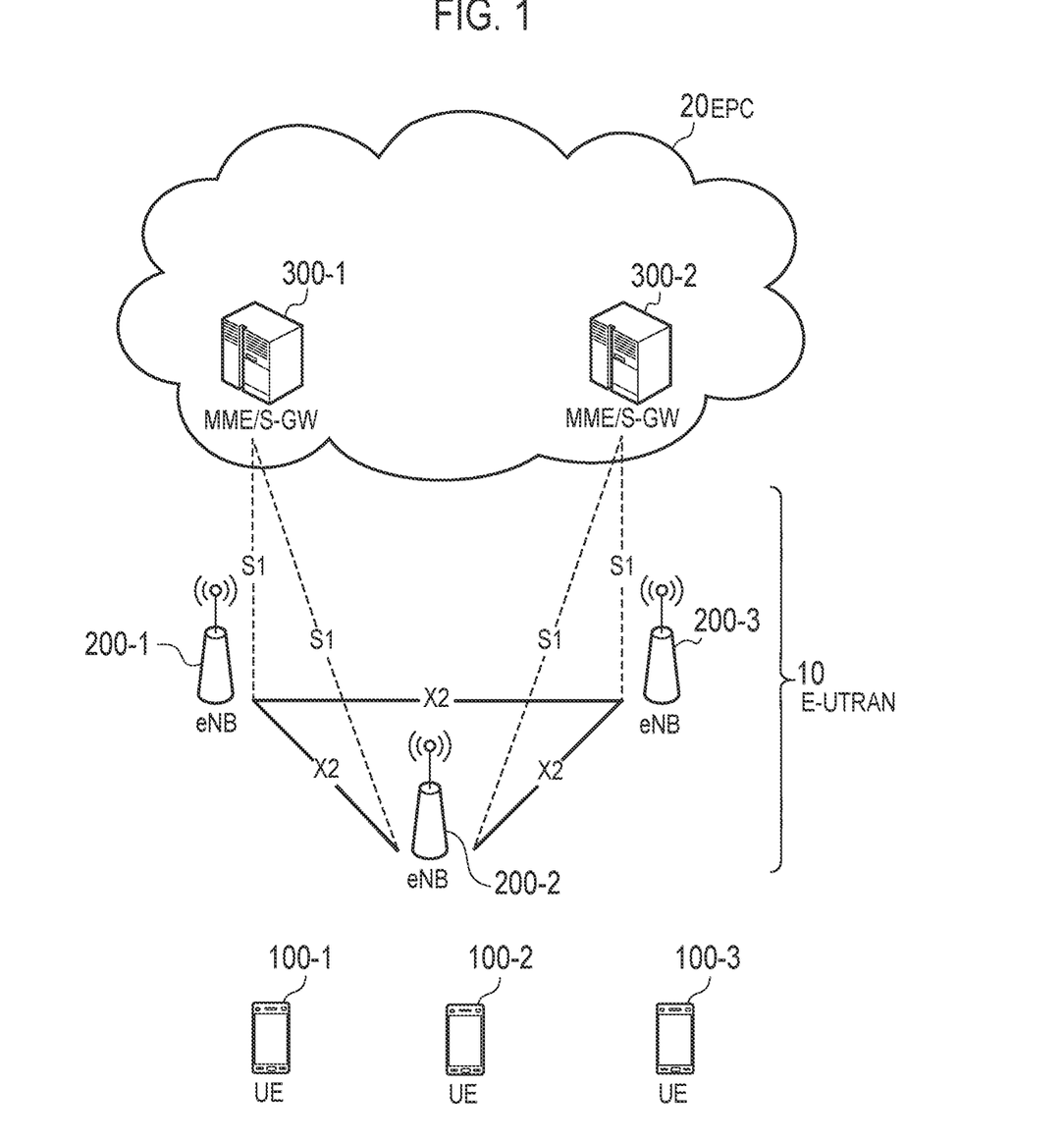
FIG. 1 is a diagram illustrating a configuration of an LTE system (mobile communication system) according to an embodiment.

The configuration of a mobile communication system according to an embodiment is described. FIG. 1 is a view illustrating the configuration of a Long Term Evolution (LTE) system which is the mobile communication system according to the embodiment. The LTE system is a mobile communication system which conforms to a 3GPP standard.

The LTE system includes radio terminals (UE: User Equipments) 100, a radio access network (E-UTRAN: Evolved-UMTS Terrestrial Radio Access Network) 10, and a core network (EPC: Evolved Packet Core) 20.

The UE 100 is a mobile communication apparatus. The UE 100 performs radio communication with an eNB 200 which manages a cell (serving cell) in which the UE 100 per se exists.

The E-UTRAN 10 includes the base stations (eNBs: evolved Node-Bs) 200. The eNBs 200 are interconnected with each other via X2 interfaces. The eNB 200 manages one or a plurality of cells. The eNB 200 performs radio communication with the UE 100 which establishes connection with the own cell. The eNB 200 has a radio resource management (RRM) function, a routing function of user data (hereinafter, simply referred to as "data"), a measurement control function for a mobility control and scheduling and the like. "Cell" is used as a term indicating a minimum unit of a radio communication area. The "Cell" is used as a term indicating a function or a resource for performing radio communication with the UE 100.

The EPC 20 includes mobility management entities (MMEs) and serving gateways (S-GWs) 300. The MME performs various mobility control and the like for the UE 100. The MME manages information on a tracking area (TA) in which the UE 100 exists by communicating with the UE 100 by using non-access stratum (NAS) signaling. The tracking area is an area including a plurality of cells. The S-GW performs transmission control of data. The MME and S-GW are connected to the eNB 200 via an S1 interface.

Figure 2:
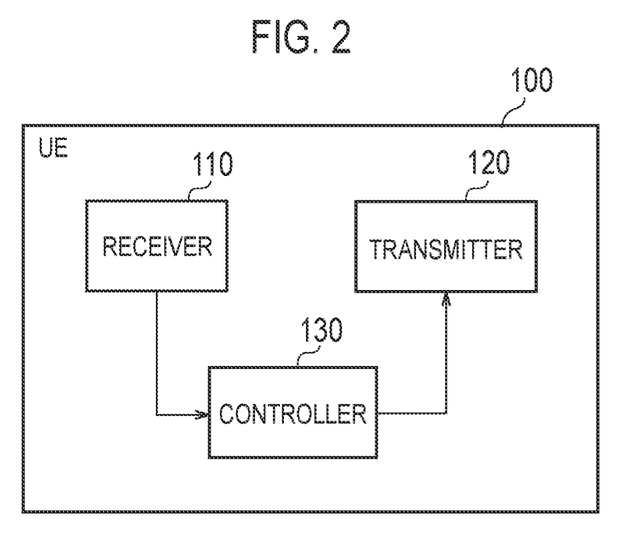
FIG. 2 is a diagram illustrating a configuration of a UE (radio terminal) according to the embodiment.

FIG. 2 is a view illustrating the configuration of the UE 100 (radio terminal). The UE 100 includes a receiver 110, a transmitter 120, and a controller 130.

The receiver 110 performs various receptions under a control of the controller 130. The receiver 110 includes an antenna and a reception device. The reception device outputs a radio signal which the antenna receives to the controller 130 after converting the radio signal into a baseband signal (reception signal).

The transmitter 120 performs various transmissions under a control of the controller 130. The transmitter 120 includes an antenna and a transmission device. The transmission device transmits a baseband signal (transmission signal) which the controller 130 outputs from the antenna after converting the baseband signal into a radio signal.

The controller 130 performs various controls in the UE 100. The controller 130 includes at least one processor and a memory. The memory stores programs executed by the processor and information used in processing performed by the processor. The processor may include a baseband processor and a Central Processing Unit (CPU). The baseband processor performs modulation/demodulation, coding/decoding and the like of the baseband signal. The CPU performs various processing by executing programs stored in the memory. The processor performs processing described later.

Figure 3:
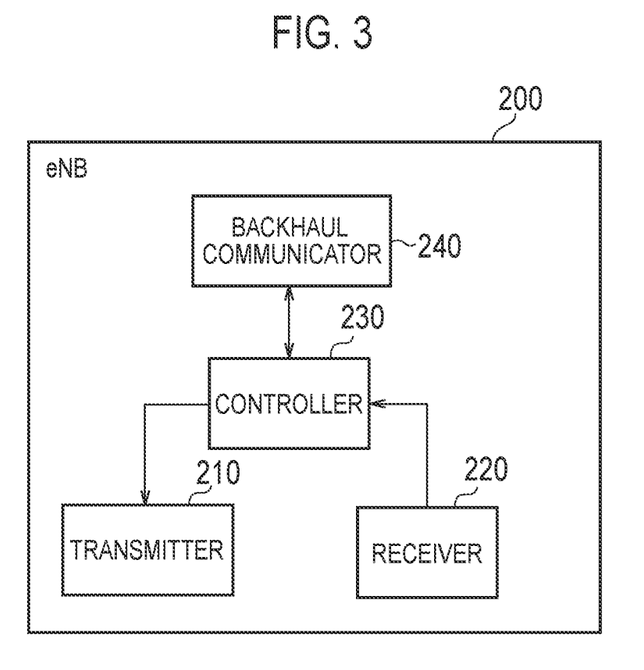
FIG. 3 is a diagram illustrating a configuration of an eNB (base station) according to the embodiment.

FIG. 3 is a view illustrating the configuration of the eNB 200 (base station). The eNB 200 includes a transmitter 210, a receiver 220, a controller 230, and a backhaul communicator 240.

The transmitter 210 performs various transmissions under a control of the controller 230. The transmitter 210 includes an antenna and a transmission device. The transmission device transmits a baseband signal (transmission signal) which the controller 230 outputs from the antenna after converting the baseband signal into a radio signal.

The receiver 220 performs various receptions under a control of the controller 230. The receiver 220 includes an antenna and a reception device. The reception device outputs a radio signal which the antenna received to the controller 230 after converting the radio signal into a baseband signal (reception signal).

The controller 230 performs various controls in the eNB 200. The controller 230 includes at least one processor and a memory. The memory stores programs executed by the processor and information used for processing performed by the processor. The processor may include a baseband processor and a CPU. The baseband processor performs modulation/demodulation and coding/decoding and the like of the baseband signal. The CPU performs various processing by executing programs stored in the memory. The processor performs processing described later.

The backhaul communicator 240 is connected to the neighboring eNB via the X2 interface. The backhaul communicator 240 is connected to the MME/S-GW 300 via the S1 interface. The backhaul communicator 240 is used for communication performed on the X2 interface, communication performed on the S1 interface and the like.

Figure 4:
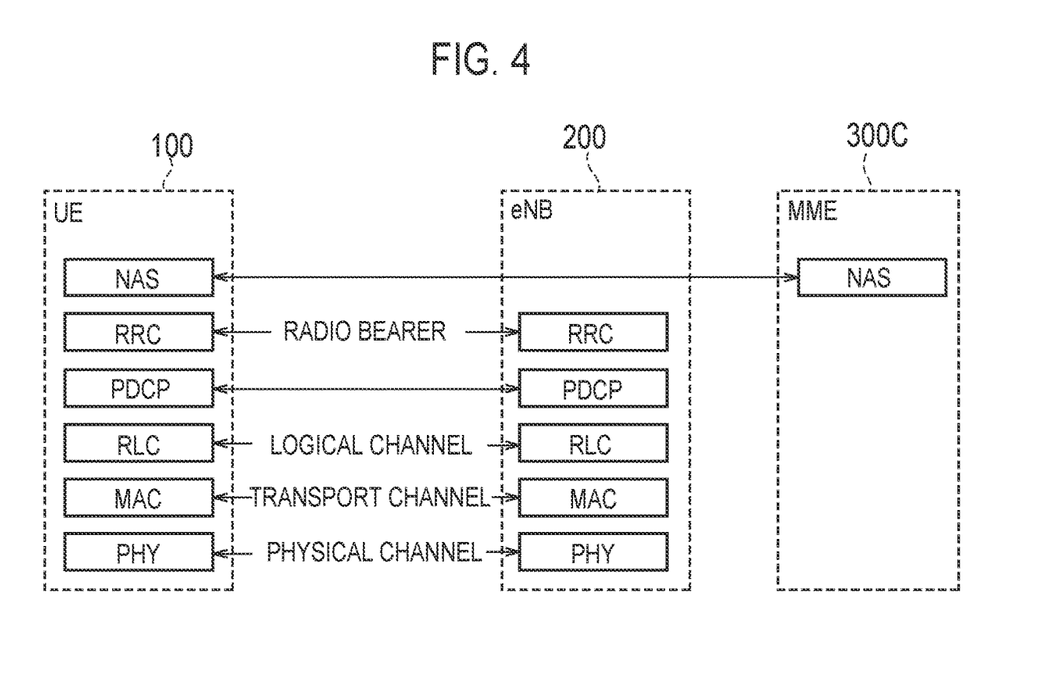
FIG. 4 is a diagram illustrating a protocol stack of a radio interface in the LTE system according to the embodiment.

FIG. 4 is a view illustrating the configuration of a protocol stack of a radio interface in the LTE system. As illustrated in FIG. 4, the radio interface protocol is divided into a first layer to a third layer in an OSI reference model. The first layer is a physical (PHY) layer. The second layer includes a Medium Access Control (MAC) layer, a Radio Link Control (RLC) layer, and a Packet Data Convergence Protocol (PDCP) layer. The third layer includes a Radio Resource Control (RRC) layer. A Access Stratum (AS) consists of the PHY layer, the MAC layer, the RLC layer, the PDCP layer, and the RRC layer.

The PHY layer performs coding/decoding, modulation/demodulation, antenna mapping/demapping, and resource mapping/demapping. Data and control information are transmitted between the PHY layer of the UE 100 and the PHY layer of the eNB 200 via a physical channel.

The MAC layer performs a priority control of data, retransmission processing by a hybrid ARQ (HARQ), a random access procedure and the like. Data and control information are transmitted between the MAC layer of the UE 100 and the MAC layer of the eNB 200 via a transport channel. The MAC layer of the eNB 200 includes a scheduler. The scheduler decides a transport format (a transport block size, a modulation/coding method (MCS)) of an uplink and a downlink and an allocation resource block to the UE 100.

The RLC layer transmits data to the RLC layer on a reception side using functions of the MAC layer and the PHY layer. Data and control information are transmitted between the RLC layer of the UE 100 and the RLC layer of the eNB 200 via a logical channel.

A PDCP layer performs header compression/expansion and ciphering/deciphering.

The RRC layer is defined only on a control plane where control information is handled. RRC signaling for various establishment is transmitted between the RRC layer of the UE 100 and the RRC layer of the eNB 200. The RRC layer controls a logical channel, a transport channel, and a physical channel in response to the establishment, the re-establishment and the release of a radio bearer. When the connection (RRC connection) is established between the RRC of the UE 100 and the RRC of the eNB 200, the UE 100 is in an RRC connected mode. When the connection (RRC connection) is not established between the RRC of the UE 100 and the RRC of the eNB 200, the UE 100 is in an RRC idle mode.

A NAS layer which is a higher layer of the RRC layer performs session management, mobility management, and the like. NAS signaling is transmitted between the NAS layer of the UE 100 and the NAS layer of an MME 300C. The UE 100 has a function of an application layer or the like in addition to the radio interface protocol.

Figure 5:
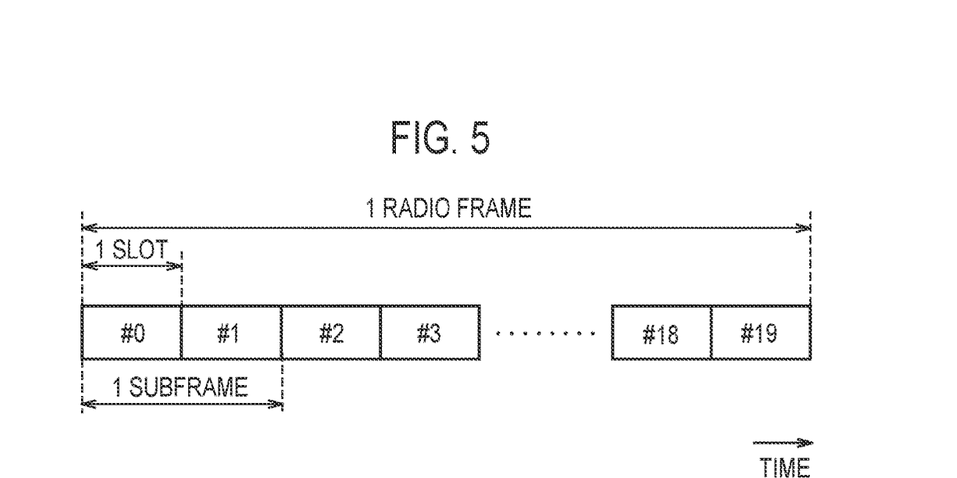
FIG. 5 is a diagram illustrating a configuration of a radio frame of the LTE system according to the embodiment.

FIG. 5 is a diagram illustrating a configuration of a radio frame used in an LTE system. The radio frame includes ten subframes on a time axis. Each subframe includes two slots on the time axis. A length of each subframe is 1 ms. A length of each slot is 0.5 ms. Each subframe includes a plurality of resource blocks (RBs) on a frequency axis. Each subframe includes a plurality of symbols on the time axis. Each resource block includes a plurality of subcarriers on the frequency axis. Specifically, 12 subcarriers and one slot constitute one RB. One symbol and one subcarrier constitute one resource element (RE). Among radio resources (time and frequency resources) allocated to the UE 100, a frequency resource can be specified by the resource blocks, and a time resource can be specified by the subframes (or slots).

In a downlink, a period of several leading symbols of each subframe is an area as a physical downlink control channel (PDCCH) for primarily transmitting downlink control information. A remaining portion of each subframe is an area capable of being used as a physical downlink shared channel (PDSCH) for primarily transmitting downlink data.

In an uplink, both end portions of each subframe in a frequency direction are areas used as physical uplink control channels (PUCCHs) for primarily transmitting uplink control information. A remaining portion of each subframe is an area capable of being used as a physical uplink shared channel (PUSCH) for primarily transmitting uplink data.

(2) Outline of eMTC and NB-IoT

The outline of eMTC and NB-IoT will be described. In the embodiment, a scenario in which the UEs 100 belonging to new categories are present is assumed. The UEs 100 belonging to the new categories are the UEs 100 each having a transmission and reception bandwidth restricted to only a part of a system transmission and reception band (LTE transmission and reception bandwidth). For example, the new UE categories are referred to as a category M1 and a category narrow band (NB)-IoT (Internet of Things). The category M1 is a category to which enhanced machine type communications (eMTC) UEs belong. The category NB-IoT (category NB1) is a category to which NB-IoT UEs belong. The category M1 restricts the transmission and reception bandwidth of the UE 100 (eMTC UE) to 1.08 MHz (that is, a bandwidth of six resource blocks). The category NB-IoT (category NB1) further restricts the transmission and reception bandwidth of the UE 100 (NB-IoT UE) to 180 kHz (that is, a bandwidth of one resource block). It is possible to realize low cost and low power consumption required of the eMTC UE and the NB-IoT UE by narrowing the bandwidth in this manner. Hereinafter, one frequency band with which the eMTC UE and the NB-IoT UE can cope is referred to as a "frequency channel".

Figure 6:
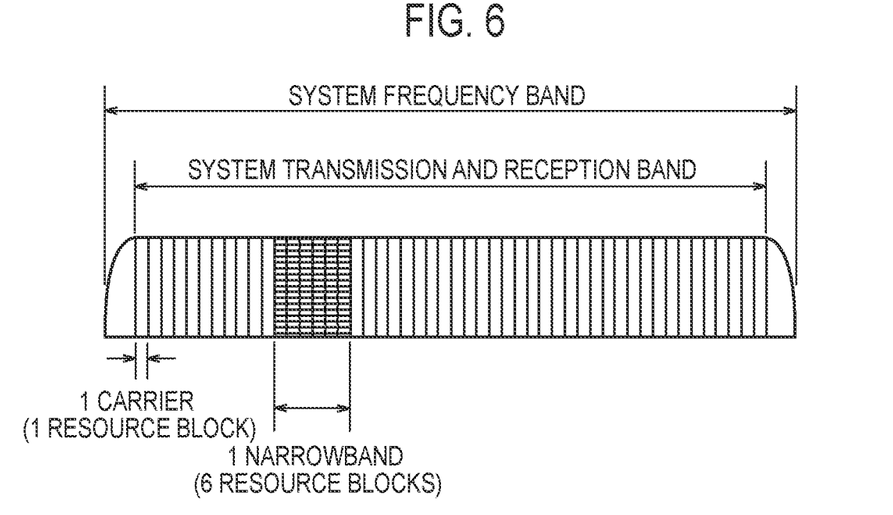
FIG. 6 is a diagram illustrating a frequency channel used by an eMTC UE and an NB-IoT UE according to the embodiment.

FIG. 6 is a diagram illustrating the frequency channel used by the eMTC UE and the NB-IoT UE. As illustrated in FIG. 6, a frequency bandwidth of a system frequency band of the LTE system may be 10 MHz. A bandwidth of the system transmission and reception band is, for example, 50 resource blocks=9 MHz. A bandwidth of the frequency channel with which the eMTC UE can cope is six resource blocks=1.08 MHz. The frequency channel of six resource blocks or less with which the eMTC UE can cope is referred to as a "narrowband (NB)". A bandwidth of the frequency channel with which the NB-IoT UE can cope is one resource block=180 kHz. The frequency channel of one resource block with which the NB-IoT UE can cope is referred to as a "carrier".

The eMTC UE is operated within the LTE transmission and reception bandwidth. The NB-IoT UE supports a form that is operated within the LTE transmission and reception bandwidth, a form that is operated in a guard band outside the LTE transmission and reception bandwidth, and a form that is operated within a dedicated NB-IoT frequency band.

The eMTC UE and the NB-IoT UE support an enhanced coverage (EC) function using repetitive transmission and the like in order to realize coverage widening (coverage enhancement). The enhanced coverage function may include repetitive transmission (repetition) for repetitively transmitting the same signal by using a plurality of subframes. As the number of times of the repetitive transmission becomes larger, it is possible to enhance the coverage. The enhanced coverage function may include power boosting for increasing a power density of a transmit signal. For example, the power density is increased by narrowband transmission for narrowing a frequency bandwidth of the transmit signal. As the power density of the transmit signal becomes higher, it is possible to enhance the coverage. The enhanced coverage function may include lower MCS transmission for lowering an MCS used for the transmit signal. It is possible to enhance the coverage by performing transmission by using an MCS with a low data rate and high error resilience.

(3) Paging and Random Access of NB-IoT UE

The Paging and random access of the NB-IoT UE will be described. Hereinafter, an example in which the UE 100 is the NB-IoT UE will be described. However, the UE 100 may be the eMTC UE. When the UE 100 is the eMTC UE, the "narrowband (NB)" may be used instead of the "carrier".

Figure 7:
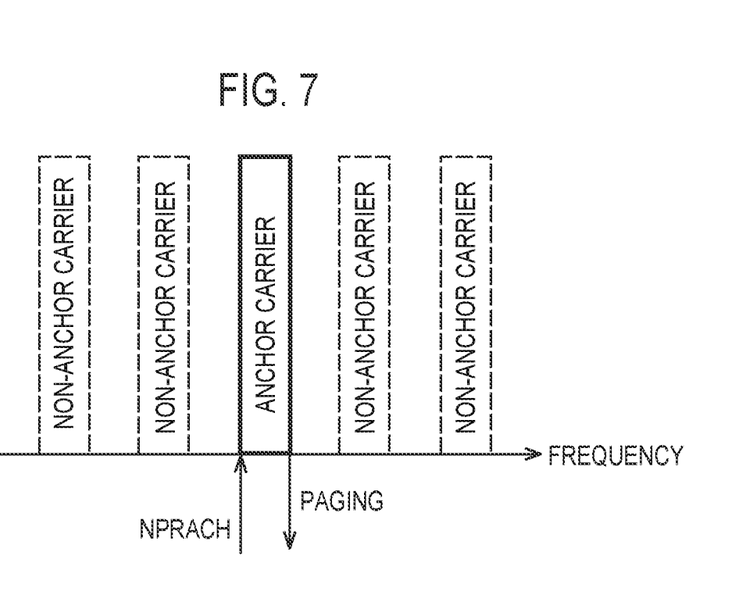
FIG. 7 is a diagram illustrating an example of paging and random access of the NB-IoT UE in a 3GPP Release 13 specification.

FIG. 7 is a diagram illustrating an example of the paging and random access of the NB-IoT UE in a 3GPP Release 13 specification. As illustrated in FIG. 7, the eNB 200 manages a plurality of carriers. Each of the plurality of carriers is operated within the LTE transmission and reception bandwidth, within the guard band outside the LTE transmission and reception bandwidth, or within the dedicated NB-IoT frequency band. The plurality of carriers includes anchor carriers and non-anchor carriers. The UE 100 assumes that the anchor carrier is a carrier which transmits a narrowband primary synchronization signal (NPSS), a narrowband secondary synchronization signal (NSSS), a narrowband physical broadcast channel (NPBCH), and a system information block-narrowband (SIB-NB). The NPSS and the NSSS are physical synchronization signals for the NB-IoT UE. The NPBCH is a physical broadcast channel for the NB-IoT UE. The SIB-NB is a SIB for the NB-IoT UE. The UE 100 assumes that the non-anchor carrier is a carrier which does not transmit the NPSS, the NSSS, the NPBCH, and the SIB-NB. Information on the carrier defined as a carrier that may be used as the anchor carrier in the specification may be configured for the UE 100 in advance.

In the 3GPP Release 13 specification, the anchor carrier is used in paging and random access procedures. Specifically, the eNB 200 transmits a paging message addressed to the UE 100 in an RRC idle mode by using the anchor carrier. The UE 100 receives the paging message addressed to the UE itself. The UE 100 starts the random access procedure for transitioning to an RRC connected mode from the RRC idle mode in response to the reception of the paging message. Specifically, the UE 100 transmits a random access signal to the eNB 200 by using the anchor carrier. The random access signal may be referred to as a random access preamble. The physical channel used by the NB-IoT UE which transmits the random access signal is referred to as a narrowband physical random access channel (NPRACH).

The eNB 200 may configure the non-anchor carrier for the UE 100 that transitions to the RRC connected mode from the RRC idle mode through the random access procedure. The UE 100 for which the non-anchor carrier is configured communicates with the eNB 200 by using only the non-anchor carrier during the RRC connected mode. A radio resource for transmitting the synchronization signal, the paging message, and the broadcast information (SIB) may not be allocated to the non-anchor carrier. Accordingly, a radio resource for data allocated to the non-anchor carrier may be further increased than a radio resource allocated to the anchor carrier.

Figure 8:
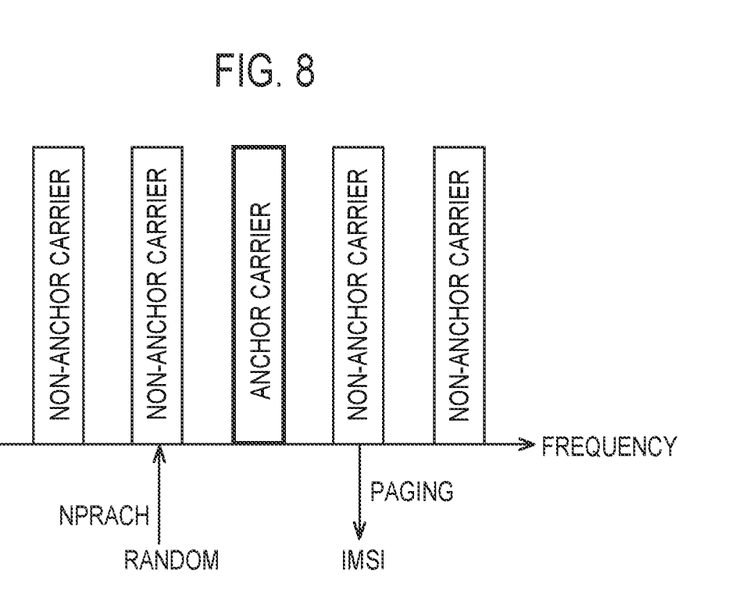
FIG. 8 is a diagram illustrating an example of paging and random access of the NB-IoT UE in a 3GPP Release 14 specification.

FIG. 8 is a diagram illustrating an example of paging and random access of the NB-IoT UE in a 3GPP Release 14 specification. In the 3GPP Release 13, not only the anchor carrier but also the non-anchor carrier may be used in the paging and random access procedures. Specifically, the eNB 200 and the UE 100 select carriers used for transmitting and receiving the paging message based on an identifier of the UE 100 as a destination of the paging message. An international mobile subscriber identity (IMSI) stored in a user identity module (UIM) of the UE 100 is used as such an identifier. The UE 100 receives the paging message addressed to the UE itself by using the carrier selected based on the UIM or IMSI. The UE 100 starts the random access procedure for transitioning to an RRC connected mode from the RRC idle mode in response to the reception of the paging message. Specifically, the UE 100 transmits the random access signal (NPRACH) to the eNB 200 by using the randomly selected carrier. Due to the use of such a carrier selection method, it is possible to avoid load concentration on the anchor carrier, and it is possible to distribute a load to the non-anchor carrier.

Figure 9:
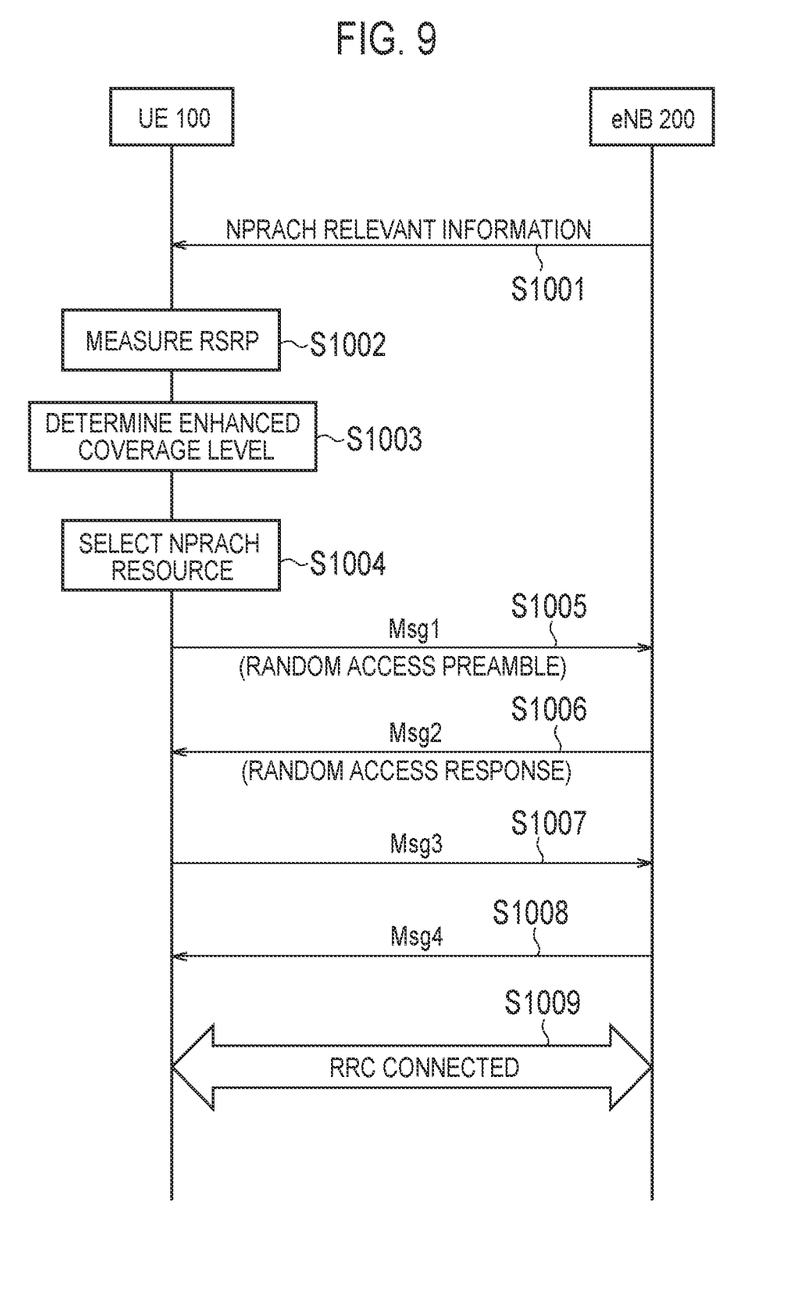
FIG. 9 is a diagram illustrating an example of a random access procedure for the NB-IoT UE.

FIG. 9 is a diagram illustrating an example of the random access procedure for the NB-IoT UE. The UE 100 performs the random access procedure in order to transition to the RRC connected mode from the RRC idle mode.

The UE 100 in the RRC idle mode selects a cell of the eNB 200 as a serving cell. When a first cell selection criteria (first S-criteria) for a normal coverage is not satisfied and a second cell selection criteria (second S-criteria) for an enhanced coverage is satisfied, the UE 100 may determine that the UE itself is present in the enhanced coverage. The "UE present in the enhanced coverage" means a UE required to use the enhanced coverage function (enhanced coverage mode) in order to access the cell.

In step S1001, the eNB 200 transmits NPRACH relevant information by broadcast signaling (for example, SIB type 2-NB). The NPRACH relevant information includes various parameters prepared for enhanced coverage levels. For example, a total of four enhanced coverage levels from 0 to 3 are assumed as the enhanced coverage levels. The various parameters include a reference signal received power (RSRP) threshold, an NPRACH resource, and the maximum number of times of the preamble transmission. The NPRACH resource includes radio resources (time and frequency resource) and a signal sequence (preamble sequence). The UE 100 stores the received NPRACH relevant information.

In step S1002, the UE 100 measures an RSRP based on a reference signal transmitted from the eNB 200.

In step S1003, the UE 100 determines the enhanced coverage level of the UE itself by comparing the measured RSRP with the RSRP threshold for each enhanced coverage level. The enhanced coverage level indicates a degree of the enhanced coverage required by the UE 100. The enhanced coverage level is related to at least the number of times of transmission (that is, the number of times of repetition) in the repetitive transmission.

In step S1004, the UE 100 selects the NPRACH resource corresponding to the enhanced coverage level of the UE itself. The UE 100 may select the carrier used for the NPRACH transmission (preamble transmission) among the plurality of carriers managed by the eNB 200. The carrier used for the NPRACH transmission (preamble transmission) may be a predetermined anchor carrier or a randomly selected carrier.

In step S1005, the UE 100 transmits Msg 1 (random access preamble) to the eNB 200 by using the selected carrier and the selected NPRACH resource. The eNB 200 specifies the enhanced coverage level of the UE 100 based on the NPRACH resource used for the received Msg 1.

In step S1006, the eNB 200 transmits Msg 2 (random access response) including scheduling information to the UE 100. The scheduling information indicates a narrowband physical uplink shared channel (NPUSCH) resource allocated to the UE 100. The UE 100 may transmit the Msg 1 up to the maximum number of times of the preamble transmission corresponding to the enhanced coverage level of the UE itself by multiple times until the Msg 2 is normally received.

In step S1007, the UE 100 transmits Msg 3 to the eNB 200 based on the scheduling information. The Msg 3 may a RRC connection request message for requesting establishment of the RRC connection. The Msg 3 may be a RRC connection resume request message for requesting recovery of the RRC connection.

In step S1008, the eNB 200 transmits Msg 4 to the UE 100.

In step S1009, the UE 100 transitions to the RRC connected mode in response to the reception of the Msg 4. Thereafter, the eNB 200 controls the repetitive transmission, the MCS, or the like based on the specified enhanced coverage level.

As stated above, the UE 100 determines the enhanced coverage level of the UE 100 itself by measuring the RSRP based on the reference signal transmitted from the eNB 200 and comparing the measured RSRP with the RSRP threshold. The UE 100 transmits the random access preamble by using the NPRACH resource corresponding to the determined enhanced coverage level. The eNB 200 receives the random access preamble, and specifies the enhanced coverage level of the UE 100 based on the received random access preamble (specifically, the NPRACH resource). The eNB 200 controls the repetitive transmission, the MCS, or the like based on the specified enhanced coverage level.

(4) Operation According to Embodiment

In the aforementioned random access procedure, the eNB 200 may estimate an approximate radio condition (specifically, received power) of the UE 100 (NB-IoT UE) before a point of time when the random access preamble is transmitted based on the random access preamble. The NB-IoT UE is basically assumed to be a non-mobile apparatus and an apparatus that performs data transmission for a short time. On such an assumption, it is considered that the eNB 200 can perform communication adapted to the radio condition of the UE 100 by performing link adaptation (repetitive transmission or the like) according to the radio condition estimated based on the random access preamble.

However, in a case where the UE 100 (NB-IoT UE) moves and/or a case where the UE 100 (NB-IoT UE) performs data transmission for a relatively long time, the radio condition may greatly vary after the random access procedure is performed. Thus, in such cases, there is a problem that it is difficult to perform the communication adapted to the radio condition of the UE 100. Hereinafter, an operation capable of solving such a problem will be described.

(4.1) Operation Flow

Figure 10:
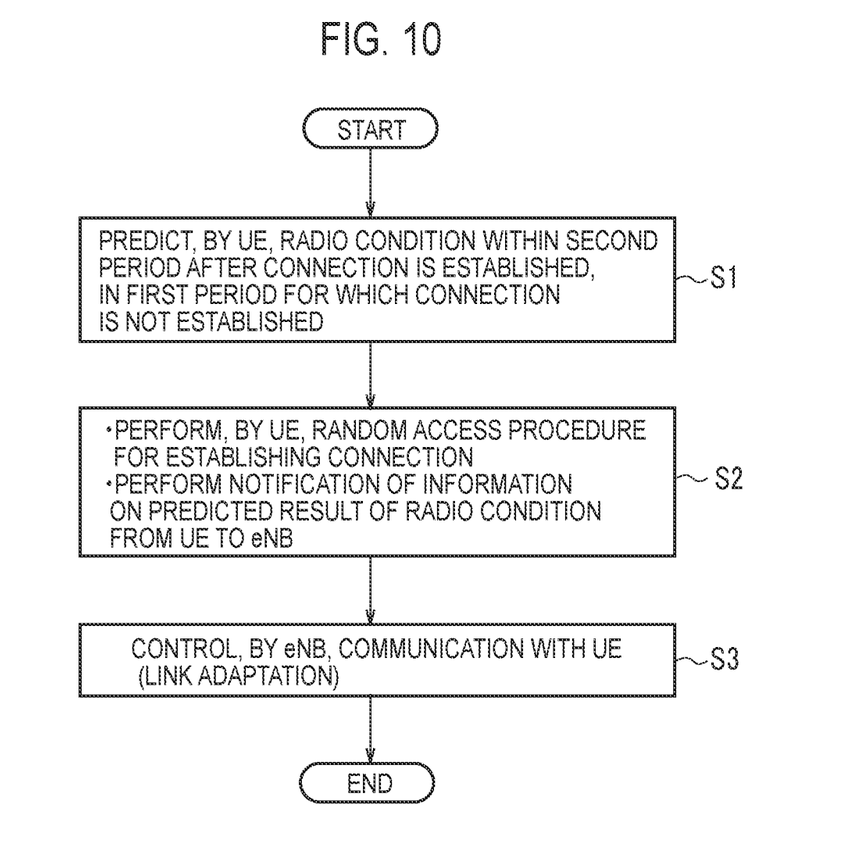
FIG. 10 is a diagram illustrating an operation flow according to the embodiment.

FIG. 10 is a diagram illustrating an operation flow according to the embodiment. Here, operations overlapped with the operations of FIG. 9 will not be described. The UE 100 may be the UE present in the enhanced coverage (CE) of the cell coverage of the eNB 200. The UE 100 is in RRC idle mode. The operation flow of FIG. 10 may be started in response to the detection that data to be transmitted to the eNB 200 is generated by the UE 100. The operation flow of FIG. 10 may be started in response to the reception of the paging message by the UE 100 from the eNB 200.

As illustrated in FIG. 10, in step S1, the UE 100 (controller 130) predicts a radio condition within a second period after the connection (RRC connection) between the UE 100 and the eNB 200 is established, in a first period for which the connection is not established. The first period may be a period for which the UE 100 is in the RRC idle mode. The second period may be a period for which the UE 100 is in the RRC connected mode (that is, data communication period).

In step S1, the UE 100 may monitor a movement state of the UE 100. The UE 100 may predict the radio condition within the second period based on the movement state. The movement state of the UE 100 includes at least one of whether or not the UE 100 is moving and a moving speed of the UE 100. The movement state of the UE 100 may be estimated from at least one of the number of times of cell reselection per unit time in the UE 100, geographical location information based on a global navigation satellite system (GNSS) provided in the UE 100, and a fading frequency measured by the UE 100. When the UE 100 predicts that the UE 100 will move or the moving speed will be high within the second period, the UE 100 may predict that variation in radio condition within the second period will be large.

In step S1, the UE 100 may estimate a length of the second period based on the amount of data after the data to be transmitted to the eNB 200 (that is, uplink data) is generated. For example, the UE 100 estimates that the second period will become longer as the amount of data to be transmitted to the eNB 200 becomes larger. Alternatively, the length of the second period may be notified to the UE 100 from the eNB 200 by the broadcast signaling or the paging message.

In step S2, the UE 100 (controller 130) performs the random access procedure for establishing the connection. The random access procedure includes a process of transmitting the random access preamble (Msg 1) to the eNB 200 from the UE 100 and a process of transmitting the RRC message (Msg 3) for requesting the establishment or recovery of the connection to the eNB 200 from the UE 100. In step S2, the UE 100 notifies the eNB 200 of information on the predicted radio condition by using the random access preamble (Msg 1) and/or the RRC message (Msg 3). The information includes at least one of information indicating whether or not the variation in radio condition within the second period is greater than a predetermined value, information indicating channel quality between the UE 100 and the eNB 200 within the second period, and information indicating the enhanced coverage level recommended to be applied to the UE 100 within the second period.

In step S3, the eNB 200 (controller 230) performs link adaptation for controlling communication with the UE 100 based on the information notified from the UE 100 during the random access procedure. For example, the eNB 200 performs link adaptation for adjusting the repetitive transmission, the MCS, or the like used for the communication with the UE 100.

(4.2) Example 1

Example 1 will be described. Example 1 is an example in which the UE 100 transmits, to the eNB 200, the RRC message (Msg 3) including the information indicating whether or not the variation in radio condition within the second period is greater than the predetermined value (threshold) in step S2 of FIG. 10 (random access procedure).

Figure 11:
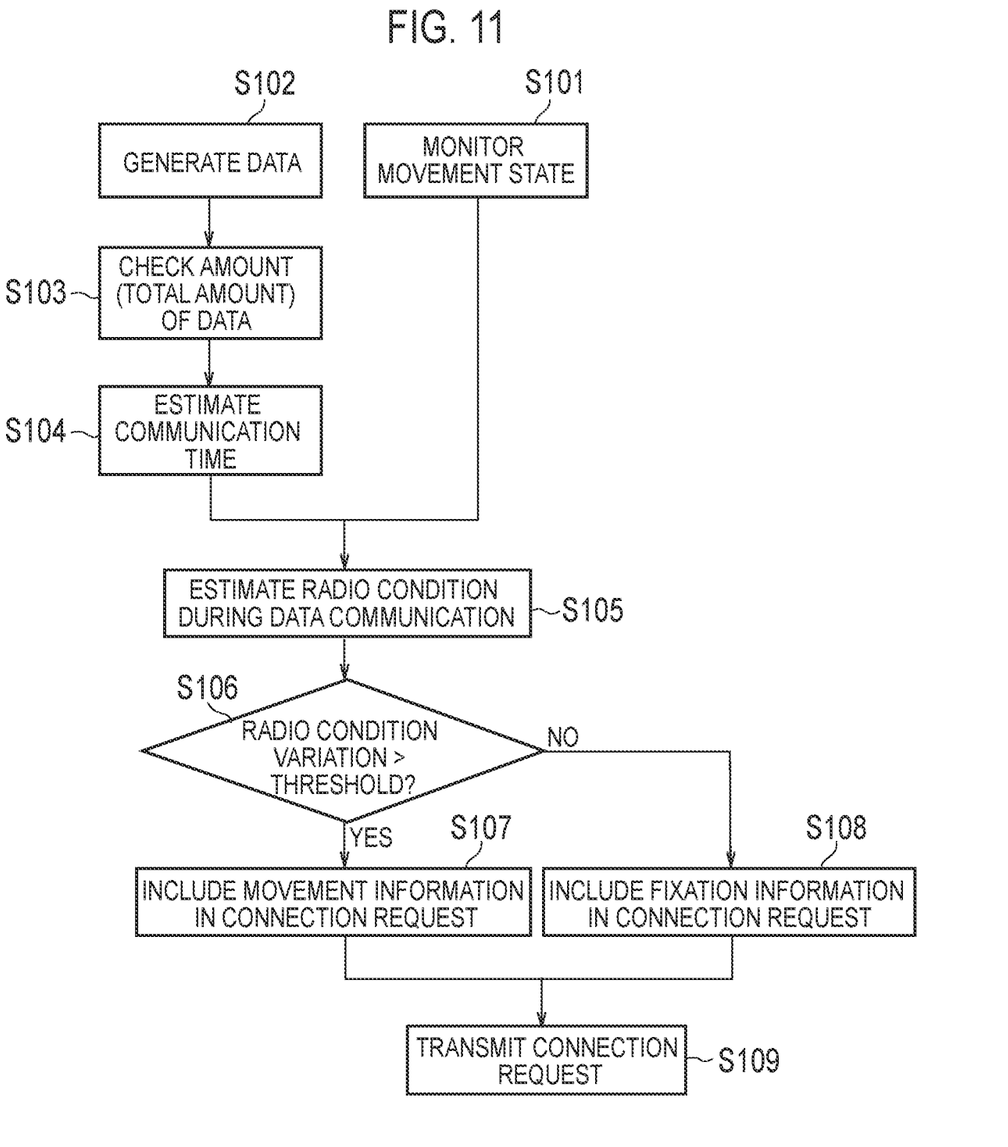
FIG. 11 is a diagram illustrating an operation of the UE according to Example 1.

FIG. 11 is a diagram illustrating an operation of the UE 100 according to Example 1.

As illustrated in FIG. 11, in step S101, the UE 100 in the RRC idle mode monitors the movement state of the UE 100 itself. The movement state of the UE 100 includes at least one of whether or not the UE 100 is moving and a moving speed of the UE 100.

In step S102, the UE 100 detects that the data to be transmitted to the eNB 200 is generated.

In step S103, the UE 100 checks the amount (total amount) of generated data. For example, the UE 100 checks the amount of generated data based on at least one of the amount of data accumulated in a buffer for the uplink and the number of data notified from a higher layer (application or the like).

In step S104, the UE 100 estimates the length of the communication time (second period) with the eNB 200 based on the amount of generated data. For example, the UE 100 estimates the length of the communication time (second period) with the eNB 200 by using at least one of a table indicating a correspondence between the amount of data and the communication time and a calculation expression for calculating the communication time from the amount of data.

In step S105, the UE 100 estimates the radio condition during data communication based on the movement state monitored in step S101 and the length of the communication time (second period) estimated in step S104. For example, the UE 100 determines that the variation in radio condition (for example, variation in channel quality) during the data communication becomes larger as the moving speed of the UE 100 during the data communication becomes higher. The UE 100 may estimate the variation in radio condition during the data communication by using at least one of a table indicating a correspondence between the movement state and a degree of variation in radio condition and a calculation expression for calculating the degree of variation in radio condition from the movement state.

In step S106, the UE 100 determines whether or not the variation in radio condition estimated in step S105 is greater than the threshold. The threshold is configured for the UE 100 in advance or is configured for the UE 100 from the eNB 200.

When the variation in radio condition estimated in step S105 is greater than the threshold (step S106: Yes), the UE 100 includes movement information to the RRC connection request message which is the RRC message for requesting the establishment of the RRC connection in step S107. The movement information is information indicating that the variation in radio condition within the second period is greater than the predetermined value (threshold). The movement information may be information indicating that the UE 100 is expected to move within the second period.

When the variation in radio condition estimated in step S105 is equal to or less than the threshold (step S106: No), the UE 100 includes fixation information to the RRC connection request message in step S108. The fixation information is information indicating that the variation in radio condition within the second period is equal to or less than the predetermined value (threshold value). The fixation information may be information indicating that the UE 100 is not expected to move within the second period.

In step S109, the UE 100 transmits, to the eNB 200, the RRC connection request message including the movement information or the fixation information in the random access procedure.

The eNB 200 may configure for the UE 100 that transmits the movement information so as to perform channel quality indicator (CQI) feedback. The eNB 200 may perform link adaptation on the UE 100 that transmits the movement information on the assumption that a radio condition is worse than the current radio condition of the UE 100 estimated from the random access preamble. For example, the eNB 200 may perform at least one operation of an operation for increasing the number of times of the repetitive transmission, an operation for decreasing the MCS, and an operation for increasing a transmit power. The operation for decreasing the MCS means that MCS with high error resilience and a low data rate is used.

The UE 100 may add information indicating a current moving speed to the RRC connection request message in addition to the movement information or the fixation information. The UE 100 may add information indicating a current moving speed instead of the movement information or the fixation information to the RRC connection request message. The information indicating the current moving speed may be an index indicating an approximate moving speed such as low/mid/high.

Although the example in which the RRC connection request message is used has been described, the RRC connection resume request message may be used instead of the RRC connection request message.

(4.3) Example 2

Example 2 will be described. Example 2 is an example in which the UE 100 transmits, to the eNB 200, the RRC message (Msg 3) including the information indicating the channel quality between the UE 100 and the eNB 200 within the second period in step S2 of FIG. 10 (random access procedure). Differences between Example 1 and Example 2 will be primarily described.

In Example 2, the UE 100 may add the CQI indicating the channel quality between the UE 100 and the eNB 200 within the second period to the RRC message (Msg 3). The CQI may be regarded as information indicating the MCS recommended to be used within the second period. The UE 100 may perform channel estimation (for example, SINR measurement) by using a cell-specific reference signal (CRS) and/or a narrowband reference signal (NRS) of the serving cell in the RRC idle mode. The UE 100 may predict channel quality that reflects the variation in radio condition within the second period by using the radio condition variation prediction described in Example 1, and may select the CQI by using the predicted channel quality. The CQI may be information indicating the lowest channel quality predicted within the second period. The eNB 200 may broadcast a mapping table indicating a correspondence between the channel quality and the CQI by using the SIB. The mapping table may be defined by the specification, and may be configured for the UE 100 in advance.

The UE 100 may add a CQI indicating the current channel quality and information indicating variation in CQI within the second period to the RRC message (Msg 3). The information indicating the variation in CQI within the second period may be a variation amount (dB) based on the radio condition variation prediction described in Example 1 or an offset amount for the current CQI. The UE 100 may add the information indicating the variation in CQI within the second period to the RRC message (Msg 3) only when the variation in radio condition within the second period is predicted to be greater than the predetermined value (threshold).

The UE 100 may further add information indicating the number of times of the repetitive transmission (the number of times of repatriation) recommended to be used within the second period to the RRC message (Msg 3). The number of times of the repetitive transmission recommended to be used within the second period may be determined based on the radio condition variation prediction described in Example 1.

(4.4) Example 3

Example 3 will be described. Example 3 is an example in which the UE 100 notifies the eNB 200 of the information indicating the enhanced coverage level recommended to be applied to the UE 100 within the second period by using the random access preamble in step S2 of FIG. 10 (random access procedure). Differences between Example 1 and Example 3 will be primarily described.

The UE 100 notifies the eNB 200 of the enhanced coverage level by using the NPRACH resource by selecting the NPRACH resource associated with the enhanced coverage level recommended to be applied to the UE 100 within the second period. The selection of the NPRACH resource is generally performed based on the current RSRP in the UE 100 (see step S1004 of FIG. 9). In contrast, in Example 3, the UE 100 selects the NPRACH resource based on a RSRP to be predicted in the future instead of the current RSRP.

The enhanced coverage level recommended to be applied to the UE 100 within the second period may be determined based on the radio condition variation prediction described in Example 1. The enhanced coverage level recommended to be applied to the UE 100 within the second period may be an enhanced coverage level corresponding to the lowest radio condition predicted within the second period. The UE 100 may notify the eNB 200 of the enhanced coverage level recommended to be applied to the UE 100 within the second period only when the variation in radio condition within the second period is predicted to be greater than the predetermined value (threshold).

In Example 3, the UE 100 may notify the eNB 200 of the enhanced coverage level by using the carrier used for the transmission of the random access preamble instead of notifying the eNB 200 of the enhanced coverage level by using the NPRACH resource. The UE 100 notifies the eNB 200 of the enhanced coverage level by using the carrier used for the preamble transmission by selecting the carrier associated with the enhanced coverage level recommended to be applied to the UE 100 within the second period. The UE 100 selects the carrier used for the preamble transmission based on the RSRP to be predicted in the future instead of the current RSRP. In this case, the enhanced coverage level is associated with each of one or a plurality of carriers. The eNB 200 may notify the UE 100 of the correspondence between the carrier and the enhanced coverage level by using the SIB, the paging message, or the like.

The eNB 200 may notify the UE 100 of information for distinguishing between the carrier used for the notification of the enhanced coverage level based on the current RSRP (that is, the enhanced coverage level notification of the related art) and the carrier used for the notification of the enhanced coverage level based on the RSRP to be predicted in the future (that is, the enhanced coverage notification of Example 3) by using the SIB, the paging message, or the like. For example, when there are carriers #1 and #2 permitted to be used for the preamble transmission, the eNB 200 notifies the UE 100 that the carrier #1 is a carrier to be used for the preamble transmission of the related art (the CE level notification of the related art) and the carrier #2 is a carrier to be used for the enhanced coverage notification of Example 3. The eNB 200 may notify the UE 100 of a combination of a list of identification information of the plurality of carriers and an identifier indicating the purpose of use of each carrier (the enhanced coverage level notification of the related art or the enhanced coverage notification of Example 3). Alternatively, the eNB 200 may classify lists according to the purpose of use, and may notify the UE 100 of a carrier list for the enhanced coverage level notification of the related art and a carrier list for the enhanced coverage notification of Example 3. When both the carrier for the enhanced coverage level notification of the related art and the carrier for the enhanced coverage notification of Example 3 are notified, the UE 100 may determine which carrier is used for the preamble transmission depending on the capability of the UE 100 (for example, whether or not the UE 100 has prediction capability) or the like.

The method of notifying the eNB 200 of the enhanced coverage level by using the carrier used for the preamble transmission may also be applied to Example 1 and Example 2. When the notifying method is applied to Example 1, the UE 100 selects the carrier associated with the information indicating whether or not the variation in radio condition within the second period is greater than the predetermined value (threshold), and performs the preamble transmission by using the selected carrier. When the notifying method is applied to Example 2, the UE 100 selects the carrier associated with the information indicating the channel quality between the UE 100 and the eNB 200 within the second period, and performs the preamble transmission by using the selected carrier.

Other Embodiments

Examples 1 to 3 described above are not limited to be individually implemented independent of each other. Combinations of two or more examples may be implemented.

In the aforementioned embodiment, the operation of the UE 100 in the RRC connected mode has not been particularly described. The UE 100 in the RRC connected mode may perform the following event triggered CQI transmission operation. When the UE 100 determines that the radio condition will become better by changing the MCS in the near future (for example, when the UE 100 predicts that radio waves will become better or worse than a threshold) during the data communication, the UE 100 may transmit the CQI. The CQI may be the prediction CQI described in Example 2. When the channel quality (for example, SINR) is greater or less than a threshold) (alternatively, when BLER is greater or less than a threshold), the UE 100 may transmit the CQI. Whether or not to perform the event triggered CQI transmission (and the threshold) may be configured for the UE 100 from the eNB 200.

In the aforementioned embodiment, the example in which the UE 100 is the NB-IoT UE has been described. However, the UE 100 may be the eMTC UE. When the UE 100 is the eMTC UE, the "narrowband (NB)" may be used instead of the "carrier" in the operation according to the aforementioned embodiment. The "PRACH" may be used instead of "NPRACH".

A program causing a computer to perform various processing performed by the UE 100 and the eNB 200 may be provided. The program may be recorded in a computer-readable medium. When the computer-readable medium is used, the program may be installed on the computer. In this example, the computer-readable medium having the program recorded therein may be a non-transitory recording medium. The non-transitory recording medium is not particularly limited, and may be, for example, a recording medium such as a CD-ROM or a DVD-ROM. A chipset constituted by a memory that stores the program for performing various processing performed by the UE 100 and the eNB 200 and a processor that executes the program stored in the memory may be provided.

It has been described in the aforementioned embodiment that the LTE system is used as the mobile communication system. However, the present disclosure is not limited to the LTE system. The operation according to the aforementioned embodiment may be applied to a mobile communication system (for example, 5th Generation mobile communication system) other than the LTE system.

INDUSTRIAL APPLICABILITY

The present disclosure is applicable in the field of radio communication.

The invention claimed is:
1. A method used in a user equipment, comprising:
receiving configuration information configuring the user equipment to perform CQI reporting, and
performing a random access procedure with a base station,
wherein the performing the random access procedure includes:
receiving a random access response message from the base station, and
in response to receiving the random access response message, transmitting a Msg 3 message to the base station,
the transmitted Msg 3 message includes, in response to receiving the configuration information, a Channel Quality Indicator (CQI) value of downlink, and
the CQI value is determined based on a mapping table indicating a correspondence between a reception level of a downlink signal and the CQI value.
2. The method according to claim 1, wherein the mapping table is preconfigured in the user equipment.
3. A user equipment comprising:
a controller configured to perform a random access procedure with a base station, wherein the controller is configured to
receive configuration information configuring the user equipment to perform CQI reporting, and
in the random access procedure, receive a random access response message from the base station, and
in response to receiving the random access response message, transmit a Msg 3 message to the base station,
the transmitted Msg 3 message includes, in response to receiving the configuration information, a Channel Quality Indicator (CQI) value of downlink, and
the CQI value is determined based on a mapping table indicating a correspondence between a reception level of a downlink signal and the CQI value.

* * * * *